US008161184B2

(12) United States Patent
Sekar et al.

(10) Patent No.: US 8,161,184 B2
(45) Date of Patent: Apr. 17, 2012

(54) METHOD AND APPARATUS FOR FACILITATING LONG-LIVED DNS QUERIES

(75) Inventors: Kiren R. Sekar, San Francisco, CA (US); Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1277 days.

(21) Appl. No.: 10/877,518

(22) Filed: Jun. 25, 2004

(65) Prior Publication Data

US 2006/0010224 A1      Jan. 12, 2006

(51) Int. Cl.
  *G06F 15/16* (2006.01)
(52) U.S. Cl. ........ 709/237; 709/204; 709/206; 709/203; 709/245; 707/718; 707/713; 707/719; 707/721; 370/314; 235/380; 705/64; 463/29; 380/258; 380/270
(58) Field of Classification Search .................. 709/219, 709/227, 206, 237, 204; 370/314; 707/718, 707/719; 235/380; 705/64; 463/29; 380/258, 380/270
See application file for complete search history.

(56) References Cited

U.S. PATENT DOCUMENTS

| | | | | |
|---|---|---|---|---|
| 5,878,212 A * | 3/1999 | Civanlar et al. | ............... | 709/203 |
| 6,016,512 A * | 1/2000 | Huitema | ........................ | 709/245 |
| 6,108,330 A * | 8/2000 | Bhatia et al. | .................... | 370/352 |
| 6,633,867 B1 * | 10/2003 | Kraft et al. | .......................... | 707/3 |
| 6,654,786 B1 * | 11/2003 | Fox et al. | ...................... | 709/203 |
| 6,701,353 B1 * | 3/2004 | Block | ............................ | 709/219 |
| 6,775,661 B1 * | 8/2004 | Redner | .............................. | 707/3 |
| 6,778,651 B1 * | 8/2004 | Jost et al. | ................. | 379/201.01 |
| 6,799,202 B1 * | 9/2004 | Hankinson et al. | ............ | 709/219 |
| 6,845,393 B1 * | 1/2005 | Murphy et al. | ................ | 709/220 |
| 6,862,627 B1 * | 3/2005 | Cheshire | ........................ | 709/227 |
| 6,898,618 B1 * | 5/2005 | Slaughter et al. | ............. | 709/203 |
| 6,944,167 B1 * | 9/2005 | McPherson | .................... | 370/401 |
| 7,016,875 B1 * | 3/2006 | Steele et al. | ...................... | 705/44 |
| 7,072,800 B1 * | 7/2006 | Fernandez et al. | ............ | 702/186 |
| 7,080,132 B2 * | 7/2006 | Cheshire | ........................ | 709/220 |
| 7,167,550 B2 * | 1/2007 | Klos et al. | ................. | 379/201.01 |
| 7,206,841 B2 * | 4/2007 | Traversat et al. | ............. | 709/225 |
| 7,237,036 B2 * | 6/2007 | Boucher et al. | ................ | 709/245 |
| 7,289,462 B1 * | 10/2007 | Mizell et al. | ..................... | 370/328 |
| 7,350,077 B2 * | 3/2008 | Meier et al. | .................... | 713/171 |
| 2003/0126136 A1 * | 7/2003 | Omoigui | .......................... | 707/10 |
| 2003/0154194 A1 * | 8/2003 | Jonas | ................................. | 707/3 |
| 2003/0182269 A1 * | 9/2003 | Cheshire | ............................ | 707/3 |
| 2003/0200335 A1 * | 10/2003 | Choi et al. | ..................... | 709/245 |
| 2004/0143579 A1 * | 7/2004 | Nakazawa | ....................... | 707/10 |
| 2004/0184458 A1 * | 9/2004 | Shimada | ........................ | 370/392 |

(Continued)

OTHER PUBLICATIONS

Woundy et al., "DHCP Lease Query", Oct. 2002.*

(Continued)

*Primary Examiner* — Krista Zele
*Assistant Examiner* — O. C. Vostal
(74) *Attorney, Agent, or Firm* — Park, Vaughan, Fleming & Dowler LLP

(57) ABSTRACT

One embodiment of the present invention provides a system that implements a long-lived query (LLQ) at a name server. During operation, the system receives an LLQ from a client at the name server, wherein the LLQ requests information related to one or more data items stored on the name server. In response to the LLQ, the system informs the client of updates to the one or more data items.

38 Claims, 6 Drawing Sheets

U.S. PATENT DOCUMENTS

2005/0278237 A1* 12/2005 Dankovchik et al. ............ 705/35
2009/0141692 A1* 6/2009 Kasslin et al. ................. 370/338

OTHER PUBLICATIONS

Cheshire et al., "DNS Long-Lived Queries", 2006.*
Cheshire et al., "Dynamic DNS Update Leases", 2006.*
Krishnamurthy et al., "On the Difficulty of Finding Optimal Relational Decompositions for XML Workloads: A Complexity Theroretic Perspective", 2003.*
Jermine et al., "The partitioned expoential file for database storage management", 2006.*
Chen et al., "Naming and Discovery in Mobile Systems".*
Palmila, "Zeroconf and UPnp techniques".*
Ousliha et al., "Service Discovery Protocols".*
Bathrick et al., "LAN-Side DSL CPE Configuration", May 2004.*
Babcock et al., "Distributed Top-K Monitoring", Jun. 2003.*
Chen et al., "NiagaraCQ: A Scalable Continuous Query System for Internet Databases", 2000.*
S. Cheshire, M. Krochmal: "DNS Based Service Discovery" Draft-Cheshire-DNSEXT-DNS-SD-01.TST, Jun. 20, 2003; XP015000501 paragraphs '0006!, '0012!.
Apple Computer, Inc.: "Long Lived Queries for DNS" HTTP://FILES.DNS-SD.ORG/DRAFT-DNS-LLQ-TXT, retrieved from Internet.

* cited by examiner

METHOD AND APPARATUS FOR FACILITATING LONG-LIVED DNS QUERIES

BACKGROUND

1. Field of the Invention

The present invention relates to computer networks. More specifically, the present invention relates to a method and an apparatus that facilitates long-lived domain name system (DNS) queries.

2. Related Art

It is presently common for a client to use a variety of services over a network. For example, a computer running Apple's iPhoto™ may share another computer's iPhoto™ album over a network. One prerequisite for using a service over a network is that, prior to using the service, a client needs to identify a specific instance of that service, for example by obtaining the service's host address and port number. It is therefore important for a client to obtain and maintain accurate and updated information for services in a network.

Clients typically become aware of a service through some type of service discovery mechanism. Although a service discovery mechanism can be provided through different network protocols, it is typically impractical to use underlying protocols that are not readily available. The existing domain name system (DNS) protocol, because of its ubiquity and extendibility, has proven to be an effective protocol for local-area service discovery, and is an excellent candidate for providing wide-area service discovery beyond the local network. In particular, the Internet Engineering Task Force (IETF) Request for Comments (RFC) 2761 specifies an extension to DNS (EDNS0), which allows a DNS message to deliver resource records (RRs) that carry service meta-information.

Unfortunately, while the extended DNS allows a name server to provide service information, it does not enable a name server to deliver continuously updated service information to the clients. A service update occurs when a service instance appears or disappears, or when the state of a service changes. Such updates are becoming progressively more frequent, as networks become more dynamic, and services become more versatile and mobile.

A traditional DNS query is "one-shot"—a name server answers a query only once, and returns only results available at that moment. Thus, when a client queries a name server, it only obtains information for a service instance at a specific point in time. To maintain up-to-date service information, a client has to periodically poll the name server. This solution has drawbacks, because a low polling rate can leave the client with stale information, and a high polling rate can have an adverse impact on network and server performance.

Hence, what is needed is a method and an apparatus that facilitates long-lived DNS queries which allow a client to obtain updated service information without polling the name server.

SUMMARY

One embodiment of the present invention provides a system that implements a long-lived query (LLQ) at a name server. During operation, the system receives an LLQ from a client at the name server, wherein the LLQ requests information related to one or more data items stored on the name server. In response to the LLQ, the system informs the client of updates to the one or more data items.

In a variation of this embodiment, receiving the LLQ involves a two-way handshake process, a three-way handshake process, or a four-way handshake process.

In a further variation, during a four-way handshake process, the system first receives an initial LLQ setup request from the client, which includes a desired lease life. To avoid potential spoofing, the system then sends a challenge to the client in response to the LLQ setup request, wherein the challenge includes a random LLQ identifier (LLQ-ID) and a granted lease life. Next, the system receives a challenge response from the client in response to the challenge, wherein the challenge response echoes the LLQ-ID. The system then sends an acknowledgement to the client in response to the challenge response, along with the information related to the one or more data items as requested by the LLQ.

In a variation of this embodiment, to subsequently inform the client of updates to the one or more data items, the system monitors the state of the one or more data items specified by the LLQ. If the state of the one or more data items changes, the system communicates the changes to the client in one or more gratuitous responses.

In a further variation, a gratuitous response message may include multiple data items corresponding to a single LLQ, unless the size of the gratuitous response message exceeds a packet-size limitation.

In a variation of this embodiment, the system receives a refresh request for one or more LLQs from a client. In response to the refresh request, the system allows the one or more LLQs to remain active for a period of time.

In a further variation, the system updates the address or listening port associated with the client upon receiving a refresh request, which indicates a change of the client's address or listening port.

In a further variation, the system sends an acknowledgement to the client in response to the refresh request.

In a variation of this embodiment, the system receives a terminate request for one or more LLQs from a client. In response to the terminate request, the system terminates the one or more LLQs specified in the refresh request.

In a variation of this embodiment, the system receives an LLQ from a client at an intermediate LLQ proxy, which communicates directly with the client, and which communicates with the name server on behalf of one or more clients.

One embodiment of the present invention provides a system that discovers a service in a network. During operation, the system maintains state information for one or more services in the network on a name server. Upon a request from a host, the system communicates from the name server information on subsequent updates of the service to the requesting host. The system stops communication of the subsequent updates to the requesting host after a period of time following receipt of the request.

One embodiment of the present invention provides a system that implements a long-lived query (LLQ). During operation, the system sends an LLQ to a name server from a client, wherein the LLQ requests information related to one or more data items stored on the name server, and wherein the LLQ remains active for a period of time. The system then receives subsequent updates of the one or more data items at the client from the name server.

In a variation of this embodiment, the system sends a refresh request before the LLQ expires so that the LLQ remains active.

One embodiment of the present invention provides a system that discovers a service in a network. During operation, the system communicates a query from a client to a name server, wherein the name server maintains state information for one or more services in the network. The system then receives subsequent updates of the service at the client from the name server.

In a variation of this embodiment, the system communicates a refresh request to the name server before the query expires, so that the query remains active.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Networks Supporting Long-Lived Queries

Figure 1:
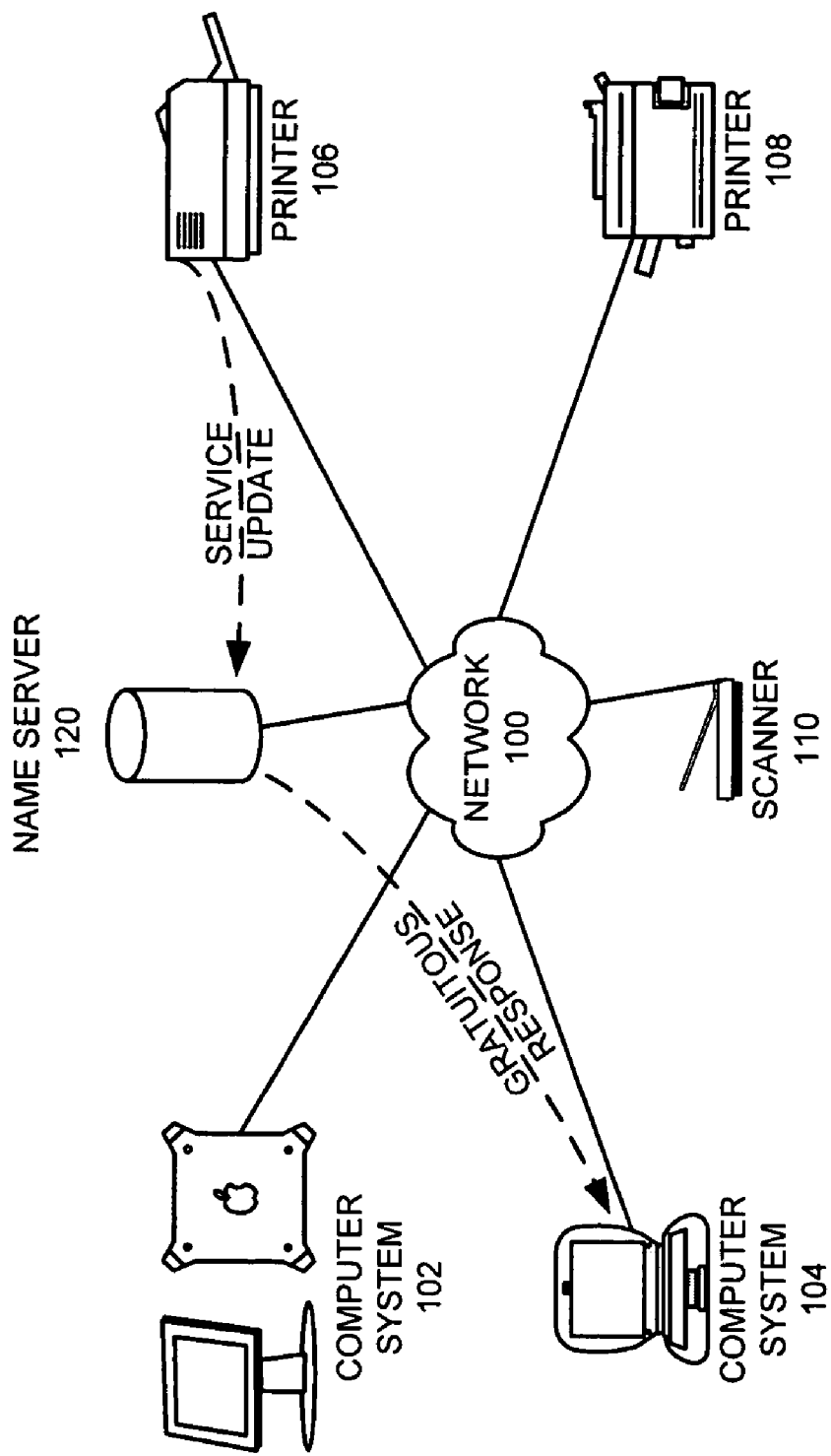
FIG. 1 illustrates a network containing a name server that supports LLQs in accordance with an embodiment of the present invention.

FIG. 1 illustrates a network containing a name server that supports LLQs in accordance with an embodiment of the present invention. As shown in FIG. 1, network 100 contains a name server 120, computer systems 102 and 104, printers 106 and 108, and a scanner 110. Note that network 100 may be a local-area network or a wide-area network, such as the Internet. In this example, both printers 106 and 108 provide printing services over network 100.

When client computer 104 needs a printing service, it sets up an LLQ at name server 120. Name server 120 maintains updated state information for both printers 106 and 108. In this example, printer 106's printing service is available and printer 108's printing service is not available when computer 102's LLQ is set up. Hence, name server 120 sends computer 104 the current information about the printing service offered by printer 106.

During the lease life granted by name server 120 to computer 104's LLQ regarding this particular service (printing service by printer 106), name server 120 automatically updates computer 104 with the latest changes of this service through gratuitous responses. For example, when printer 106 is offline or out of paper, name server 120 sends a gratuitous response which notifies computer 102 of this change of the service. In addition, if printer 108's service becomes available, name server 120 also notifies computer 102 that additional service by printer 108 is now available.

Figure 2:
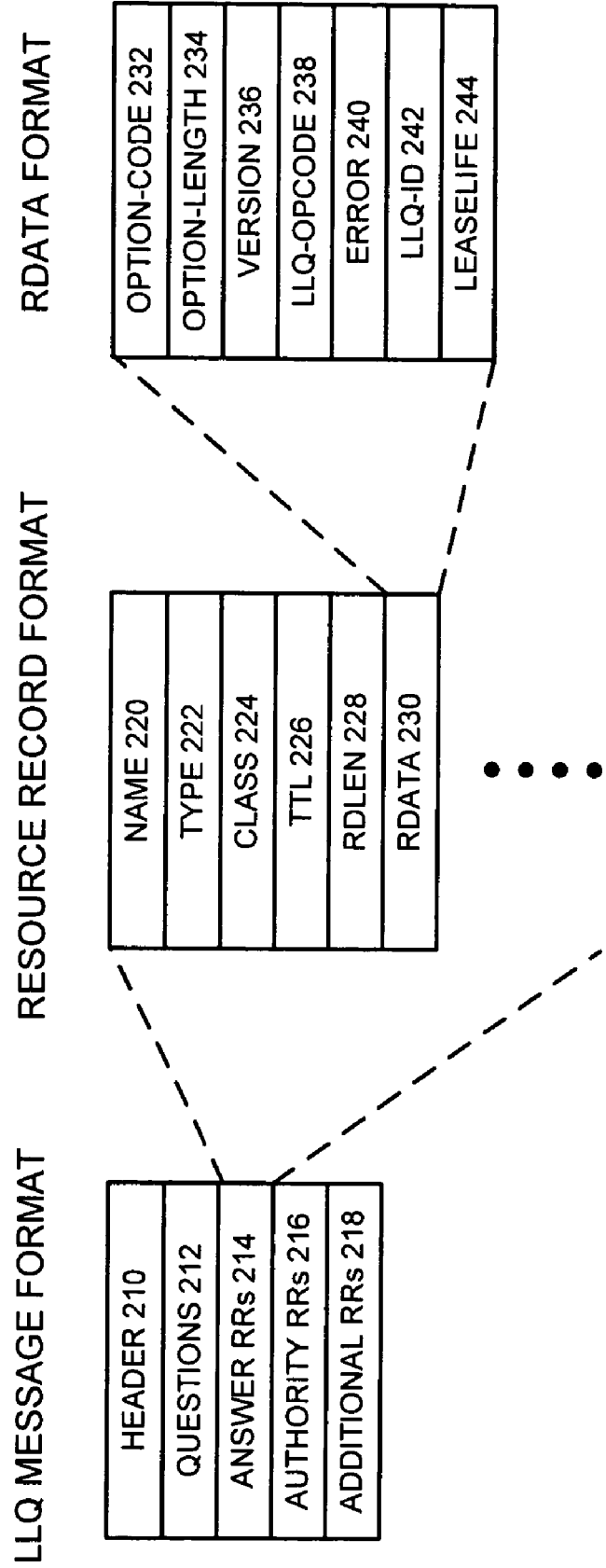
FIG. 2 illustrates a DNS message format that supports LLQs in accordance with an embodiment of the present invention.

FIG. 2 illustrates a DNS message format that supports LLQs in accordance with an embodiment of the present invention. A typical DNS message includes a header 210, a question field 212, an answer field 214, an authority field 216, and an additional information field 218. Question field 212 is used to send a query from a client to the name server. Answer field 214, authority field 216, and additional information field 218 include "resource records" (RRs) that share a common RR format. Note that each of these fields may be include one or more RRs.

Referring to FIG. 2, a resource record includes a NAME field 220, a TYPE field 222, a CLASS field 224, a time-to-live (TTL) field 226, a resource data length (RDLEN) field 228, and resource data (RDATA) field 230. One approach to implement LLQ is to use option (OPT) pseudo-RR as specified in IETF RFC 2671. Encoding an LLQ request in an OPT RR allows for implementation of LLQ with minimal modification to a name server's front-end, and causes servers that do not implement LLQ to return an appropriate error automatically.

Accordingly, NAME field 220 is the name to which the following resource data corresponds, which in this case is the root domain of the service. TYPE field 222 has the value of OPT to indicate that this is an OPT RR. CLASS field 224 indicates, as per RFC 2671, the sender's user datagram protocol (UDP) payload size. However, clients and servers are not required to determine their reassembly buffer size or path maximum transmission unit (MTU) to support an LLQ. Thus, the sender of an LLQ request or response may set CLASS field 224 to zero. The recipient ignores the CLASS field if it is set to zero. TTL field 226 indicates the number of seconds that the RR can be cached by the client. Here, TTL field 226 can be set to zero to indicate that the RR does not contain resource record data to be cached. RDLEN field 228 specifies the length of the RDATA field 230.

RDATA field 230 contains the following fields to carry LLQ information: OPTION-CODE field 232 is used to indicate that the following fields carry LLQ information. OPTION-LENGTH field 234 indicates the length of following fields. VERSION field 236 indicates the version of LLQ protocol implemented. LLQ-OPCODE field 238 identifies an LLQ operation (e.g., setup or refresh). ERROR field 240 indicates LLQ errors. LLQ-ID field 242 contains an identifier for a specific LLQ. LEASE LIFE field 244 indicates a requested or granted life of LLQ, in seconds. This data format, comprising of (OPTION-CODE, OPTION-LEN, LLQ-Metadata) tuples, may be repeated an arbitrary number of times in the RDATA field, with a properly set RDLEN field.

LLQ Setup

Figure 3:
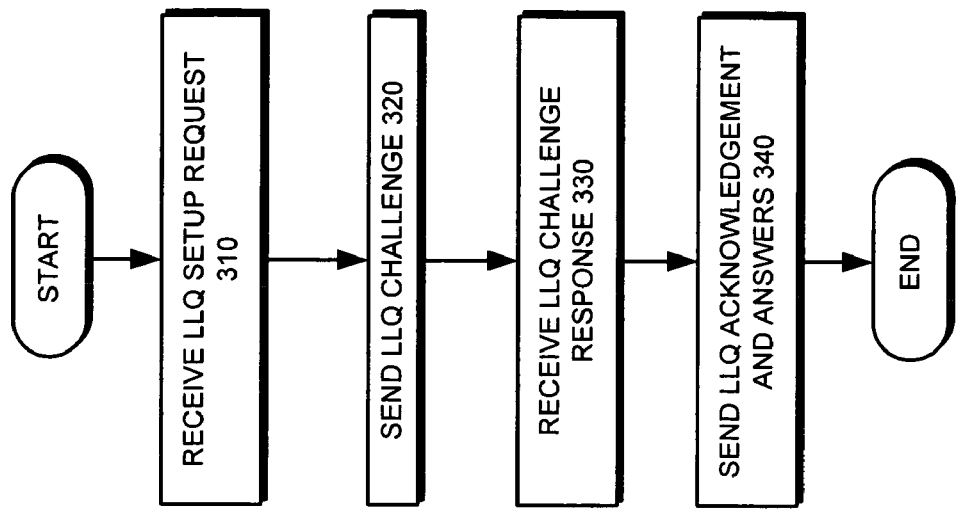
FIG. 3 presents a time-space diagram and a flowchart illustrating a four-way handshake process for setting up an LLQ in accordance with an embodiment of the present invention.
Figure 3:
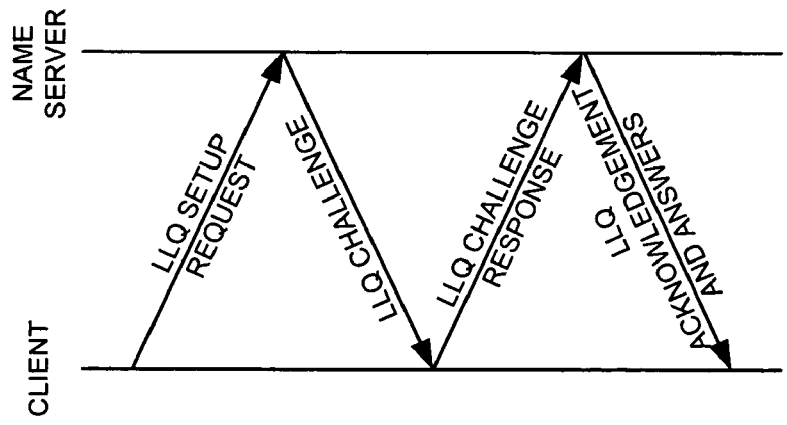

FIG. 3 presents a time-space diagram and a flowchart illustrating a four-way handshake process for setting up an LLQ in accordance with an embodiment of the present invention.

Typically, a client initiates an LLQ, and completes the LLQ setup via a four-way handshake process with the name server. This process provides a reliable setup and reduces the risk of denial of service attacks.

As shown in FIG. 3, the system in a name server starts by receiving an LLQ setup request from a client (step 310). An LLQ setup request is formatted like a standard DNS query, with an OPT RR containing LLQ metadata in its additional information field. LLQ setup requests are identified by the LLQ-SETUP OPCODE and a zero-valued LLQ-ID. An LLQ setup request may contain multiple questions to set up multiple LLQs, each of which is contained in an LLQ metadata section. An LLQ setup request may also request a lease life, during which the LLQ remain valid at the name server.

In response to the LLQ setup request, the system sends an LLQ challenge back to the client (step 320). An LLQ challenge is a DNS response, with its DNS message ID matching that of the request, and with all questions in the request present in the question field. The challenge contains an OPT-RR with an LLQ metadata section for each LLQ request, indicating the success or failure of each request. The challenge also contains an LLQ-ID and a granted lease life for each successfully requested LLQ. An LLQ-ID can be a unique random number generated by the name server. The name server discards an LLQ when its lease life expires, unless the client refreshes the LLQ in time.

Next, the system receives an LLQ challenge response sent by the client in response to the challenge (step 330). This LLQ challenge response can be a DNS request with a single OPT-RR in the additional information field, with the OPT-RR RDATA identical to the OPT-RR RDATA contained in the LLQ challenge (i.e., echoing, for each set of fields, the LLQ-ID and the granted lease life).

The system then sends out an acknowledgement acknowledging the LLQ challenge response (step 340). This acknowledgement contains all available answers to the question(s) contained in the original LLQ setup request, along with all additional RRs appropriate for those answers in the additional information field. It also contains an OPT-RR that repeats the assigned LLQ-ID and lease life.

Note that the four-way handshake process described above is just one embodiment of the present invention. It mainly targets to prevent spoofing which could lead to denial-of-service attacks. Alternatively, a two-way, three-way, or n-way handshake process may be used to set up an LLQ. In general, the actual mechanism of how an LLQ is set up does not affect the basic operation of an LLQ.

In a two-way handshake process, for example, a client first sends an LLQ setup request to the name server. Upon receiving the LLQ setup request, the name server responds with all available answers to the question(s) contained in the LLQ setup request. In the same response, the name server also assigns an LLQ-ID and a lease life for the LLQ.

In a three-way handshake process, for example, a client first sends an LLQ setup request to the name server. Upon receiving the LLQ setup request, the name server responds with all available answers to the question(s) contained in the LLQ setup request. In the same response, the name server also assigns an LLQ-ID and a lease life for the LLQ. After receiving the response, the client sends an acknowledgement back to the server to confirm successful receipt of the response.

Gratuitous Responses

Figure 4:
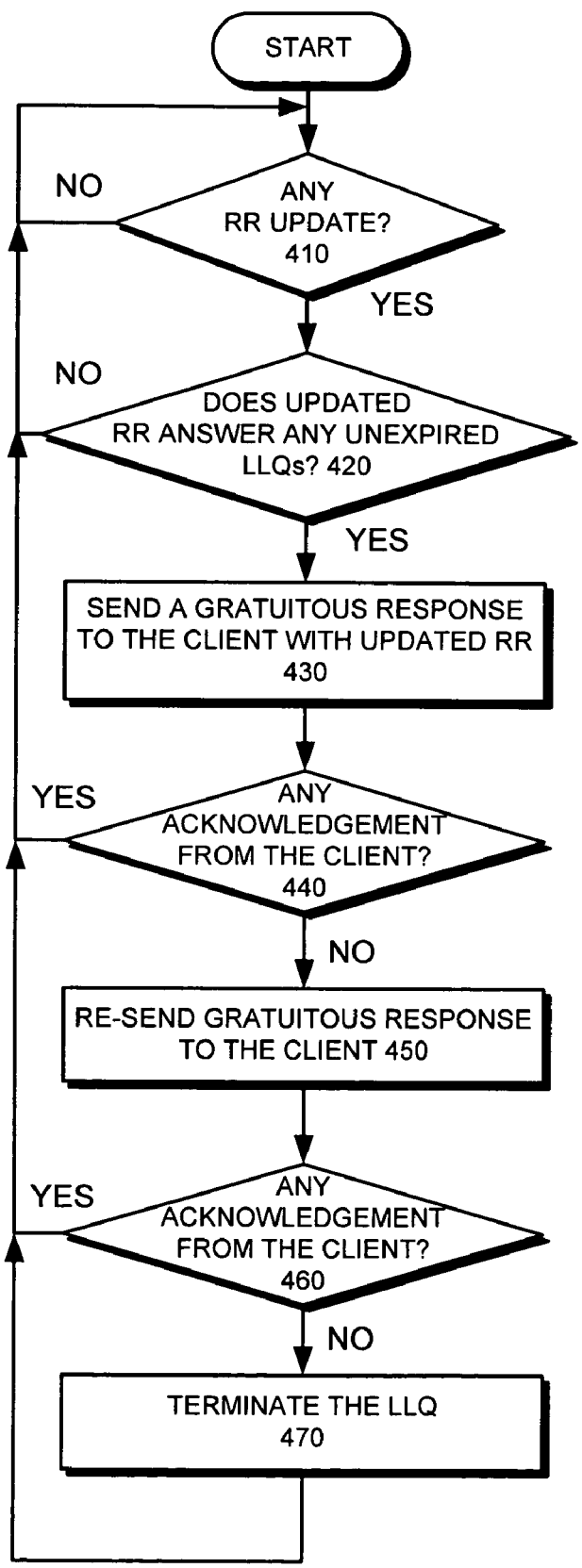
FIG. 4 presents a flowchart illustrating the process of sending network service updates to a client in accordance with an embodiment of the present invention.

FIG. 4 presents a flowchart illustrating the process of sending network service updates to a client in accordance with an embodiment of the present invention. When the state of services changes in a name server's zone, the server checks whether the updated resource records answer any LLQs whose lease lives have not expired. If so, the name server sends the updated RRs in the form of a gratuitous DNS response to the LLQ requestor client.

The name server may aggregate gratuitous responses for a single LLQ, such that a single message contains multiple RRs. However, aggregation is not desirable if it would cause a message that would otherwise fit in a single packet to be truncated, or would introduce undue latency.

After sending a gratuitous response, the name server waits for an acknowledgement from the client. If the client does not respond, the server can re-send the response a number of times, waiting for a period between each re-transmission, terminating the LLQ if no acknowledgement is received.

The flow chart in FIG. 4 illustrates this event notification process. The system in a name server starts by monitoring the state of services and determines whether there is any RR update (step 410). If not, the system continues monitoring. If so, the system determines whether the updated RR answers any unexpired LLQs (step 420). If not, the system continues monitoring the services. If so, the system sends a gratuitous response to the client with the updated RR (step 430). The system then determines whether it has received any acknowledgement from the client within a period of time (step 440). An acknowledgement indicates that the client has successfully received the gratuitous response, and the system continues its monitoring of the services. If not, the system re-sends the gratuitous response to the client (step 450), and waits for acknowledgement (step 460). If the system eventually receives an acknowledgement, the gratuitous response is successful and the system goes back to the monitoring state. If not, the system terminates the LLQ (step 470). Note that the system may re-send the gratuitous response for a number of times, and may wait for progressively longer periods between the re-sends.

LLQ Refreshing

Figure 5B:
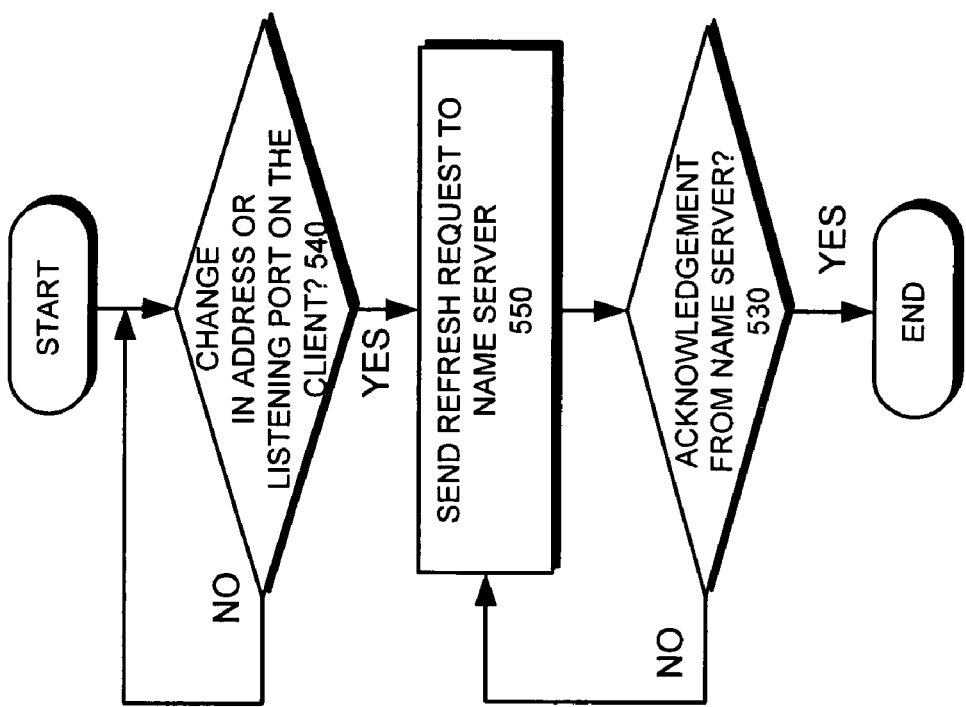
FIG. 5B presents a flowchart illustrating the process of sending a refresh request from a client to update its address or listening port in accordance with an embodiment of the present invention.
Figure 5A:
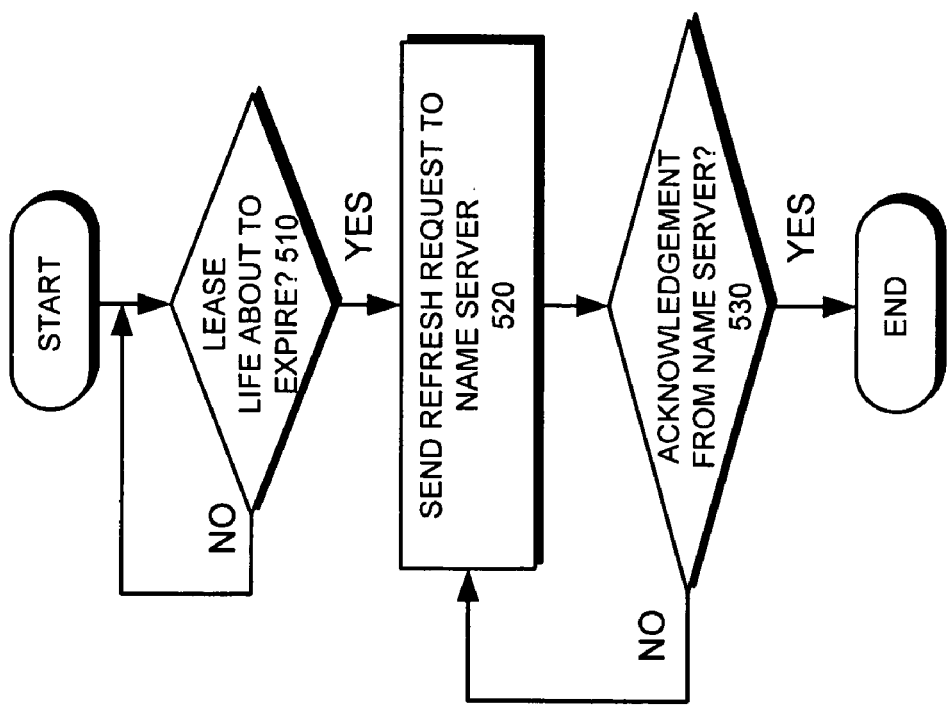
FIG. 5A presents a flowchart illustrating the process of sending a refresh request from a client to refresh the lease lives of one or more LLQs in accordance with an embodiment of the present invention.

FIG. 5A presents a flowchart illustrating the process of sending a refresh request from a client to refresh the lease lives of one or more LLQs in accordance with an embodiment of the present invention. If a client desires to maintain an LLQ beyond the duration specified in the assigned lease life, the client may send a refresh request. A refresh request is similar to an LLQ setup response, with the LLQ-OPCODE set to LLQ-REFRESH. Unlike an LLQ setup response, a refresh request returns no answers. In addition, a client may aggregate a number of LLQs in one refresh request message to reduce network traffic.

As illustrated in FIG. 5A, the client starts by determining whether the lease life of an LLQ is about to expire (step 510). If so, it sends a refresh request to the name server (step 520). It then waits for an acknowledgement from the name server (step 530). If it receives an acknowledgement, the refresh process is successful and hence complete. If it does not receive an acknowledgement after a certain period of time, it may re-transmit the refresh request to the name server (step 520). If the client determines that the name server is down because no acknowledgement is received, the client may re-establish the LLQ.

FIG. 5B presents a flowchart illustrating the process of sending a refresh request from a client to update its address or listening port in accordance with an embodiment of the present invention. If a client's address or listening port changes, the client may send an LLQ refresh request to the name server from the new address or port. Upon receiving the refresh request, the name server updates the address or port number associated with the client, and renews the lease life of the LLQ belonging to the client.

As illustrated in FIG. 5B, the client starts by determining whether there is a change in its address or listening port (step 540). If not, it continues monitoring its address and listening port. If so, the client sends a refresh request to the name server (step 550). It then waits for an acknowledgement from the name server (step 560). If it receives an acknowledgement, the refresh process is successful and hence complete. If it does not receive an acknowledgement after a certain period of time, it may re-transmit the refresh request to the name server (step 550). If the client determines that the name server is down because no acknowledgement is received, the client may re-establish the LLQ.

DNS Caching and LLQ Proxy

Figure 6:
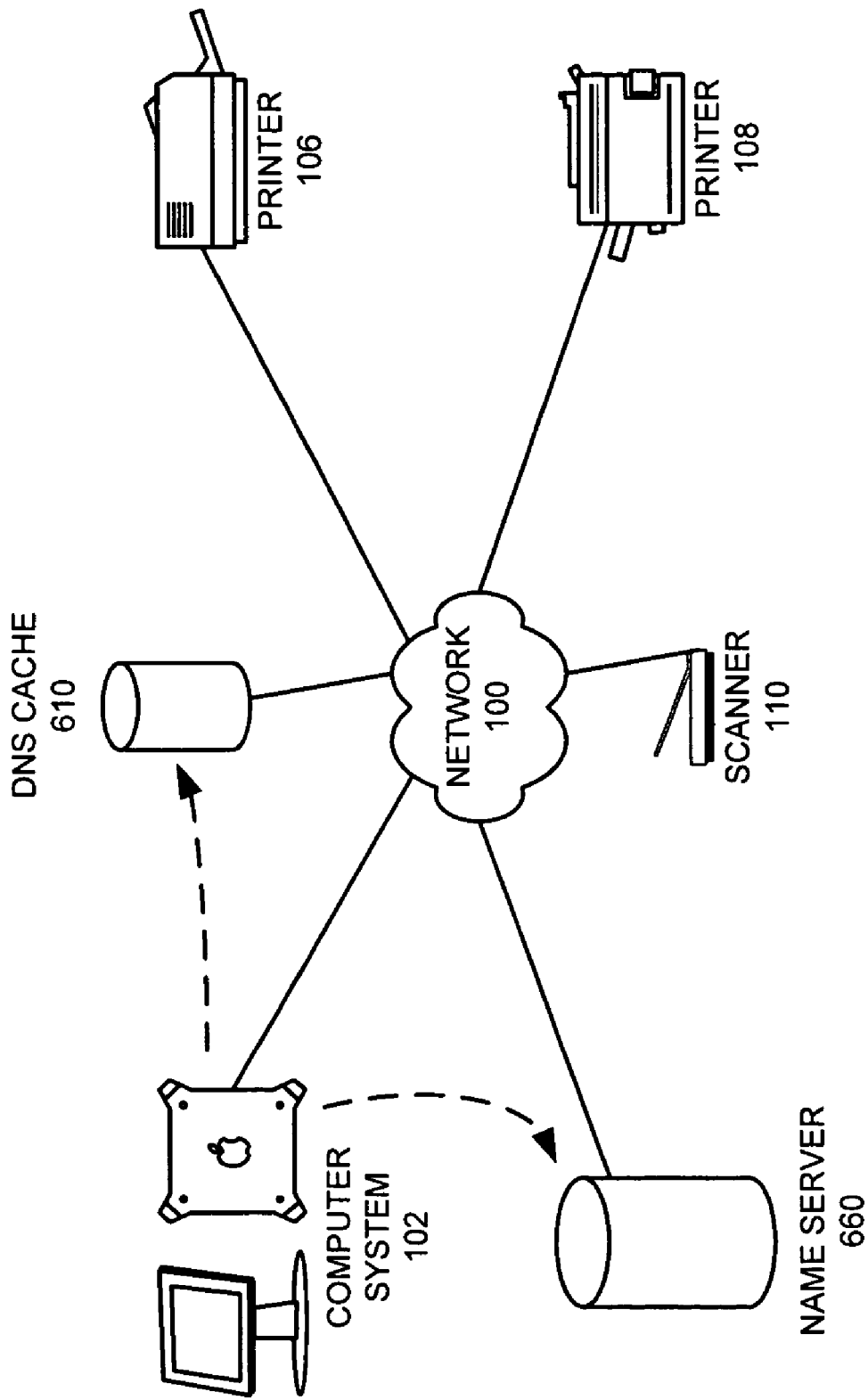
FIG. 6 illustrates a network containing a DNS cache acting as an LLQ proxy which handles LLQs in accordance with an embodiment of the present invention.

FIG. 6 illustrates a network containing a DNS cache acting as an LLQ proxy which handles LLQs in accordance with an embodiment of the present invention. Computer 102 may send LLQ setup request and control messages to an intermediate DNS cache 610. If DNS cache 610 serves as an intermediate LLQ proxy, it can communicate directly with computer 102 and with name server 660 on behalf of one or more clients.

If DNS cache 610 does not implement LLQ proxying, computer 102 needs to determine the address and port number of the name server to which it can send LLQ messages. To identify the name server that handles LLQ messages, computer 102 first sends a standard DNS query for the name of the LLQ, with type SOA (start of authority). If the SOA record exists, the name server answers with that SOA record in the answer field of its response message. If not, the name server answers with an SOA record for that name's zone in the authority field of its response message. For example, a query for _ftp._tcp.apple.com. may return an SOA record named apple.com. in the authority field of the response if there is no SOA record named _ftp._tcp.apple.com. Computer 102 then constructs and sends an SRV (service location) query for the name _dns-llq._udp.<soa-name>, which in this example is _dsn-llq._udp.apple.com. In response, a name server implementing LLQ answers with an SRV record for this name. The SRV RDATA indicates the port to which LLQ requests are to be sent.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for implementing a long-lived query (LLQ) at a domain name systems (DNS) server, comprising:
   from a client at the DNS server, receiving a DNS-formatted message which includes the LLQ that requests information related to one or more data items stored on the DNS server, which involves:
      receiving a lease life in a LEASE LIFE field in the LLQ that indicates a time in seconds for which the DNS server gratuitously informs the client of updates to the one or more data items without receiving another query from the client;
   in response to the LLQ, transmitting an initial response to the client with the requested information and granting the LLQ lease life;
   subsequent to the initial response, in response to changes of the one or more data items, determining whether the LLQ's lease life has expired; and
   in response to the LLQ's lease life being unexpired, gratuitously informing the client of updates to the one or more data items absent of receiving another query from the client.

2. The method of claim 1, wherein receiving the LLQ involves a two-way handshake process, a three-way handshake process, or a four-way handshake process.

3. The method of claim 2, wherein the four-way handshake process involves:
   receiving an initial LLQ setup request from the client, which includes a desired lease life;
   sending a challenge to the client in response to the LLQ setup request, wherein the acknowledgement includes a random LLQ identifier (LLQ-ID) and a granted lease life;
   receiving a challenge reply from the client in response to the challenge, wherein the challenge reply echoes the LLQ-ID; and
   sending an acknowledgement to the client in response to the challenge response, along with the information related to the one or more data items as requested by the LLQ.

4. The method of claim 1, wherein subsequently informing the client of updates to the one or more data items involves:
   monitoring a state of the one or more data items specified by the LLQ; and
   if the state of the one or more data items changes, communicating the changes to the client in one or more gratuitous responses.

5. The method of claim 4, wherein a gratuitous response message may include multiple data items corresponding to a single LLQ, unless a size of the gratuitous response message exceeds a packet-size limitation.

6. The method of claim 1, further comprising:
   receiving a refresh request for one or more LLQs from the client; and
   allowing the one or more LLQs to remain active for a period of time in response to the refresh request.

7. The method of claim 6, further comprising updating an address or listening port associated with the client upon receiving the received refresh request, which indicates a change of the client's address or listening port.

8. The method of claim 1, further comprising:
   receiving a terminate request for one or more LLQs from the client; and
   terminating the one or more LLQs specified in the terminate request.

9. The method of claim 1, further comprising receiving the LLQ from the client at an intermediate LLQ proxy, which communicates directly with the client, and which communicates with the DNS server on behalf of one or more clients.

10. A method for discovering a service in a network, comprising:
    maintaining state information for one or more services in the network on a domain name system (DNS) server;
    receiving from a host at the DNS server a DNS-formatted message which includes the LLQ that requests information related a service for which the state information is maintained on the DNS server, which involves:
       receiving a lease life in a LEASE LIFE field in the LLQ that indicates a time in seconds for which the DNS server gratuitously informs the host of updates to the service without receiving another query from the host;
    communicating from the DNS server to the host an initial response with the information related to the service;

subsequent to the initial response, in response to a change of the state information for one or more services, determining whether the request's lease life has expired;

in response to the request's lease life being unexpired, gratuitously sending updates of the service to the requesting host absent of receiving further requests from the host; and in response to the request's lease life being expired, stopping communication of the subsequent updates to the requesting host.

11. A method for implementing a long-lived query (LLQ), comprising:

sending, from a client to a domain name system (DNS) server, a DNS-formatted message which includes the LLQ that requests information related to one or more data items stored on the DNS server, which involves:

sending a lease life in a LEASE LIFE field in the LLQ that indicates a time in seconds for which the DNS server gratuitously informs the client of updates to the one or more data items without receiving another query from the client;

in response to the LLQ, receiving an initial response from the DNS server with the requested information;

subsequent to the initial response and before the LLQ lease life expires, receiving gratuitous updates of the one or more data items at the client from the DNS server absent of transmitting another query to the DNS server.

12. The method of claim 11, further comprising sending a refresh request before the LLQ expires so that the LLQ remains active.

13. A method for discovering a service in a network, comprising:

communicating, from a client at a DNS server a DNS-formatted message which includes an LLQ that requests information related a service for which state information is maintained on the DNS server, which involves:

communicating a lease life in a LEASE LIFE field in the LLQ that indicates a time in seconds for which the DNS server gratuitously informs the client of updates to the service without receiving another query from the client;

in response to the query, receiving an initial response from the DNS server with the information related to the service and the lease life; and subsequent to the initial response and before the lease life expires, receiving gratuitous updates of the service at the client from the DNS server absent of communicating another query to the DNS server.

14. The method of claim 13, further comprising communicating a refresh request to the DNS server before the query expires, so that the query remains active.

15. A non-transitory computer-readable storage device storing instructions that when executed by a computer cause the computer to perform a method for implementing a long-lived query (LLQ) at a domain name system (DNS) server, the method comprising:

from a client at the DNS server, receiving a DNS-formatted message which includes the LLQ that requests information related to one or more data items stored on the DNS server, which involves:

receiving a lease life in a LEASE LIFE field in the LLQ that indicates a time in seconds for which the DNS server gratuitously informs the client of updates to the one or more data items without receiving another query from the client;

in response to the LLQ, transmitting an initial response to the client with the requested information and assigning the LLQ lease life; and subsequent to the initial response and before the LLQ lease life expires, gratuitously informing the client of updates to the one or more data items absent of receiving another query from the client.

16. The computer-readable storage device of claim 15, wherein receiving the LLQ involves a two-way handshake process, a three-way handshake process, or a four-way handshake process.

17. The computer-readable storage device of claim 16, wherein the four-way handshake process involves:

receiving an initial LLQ setup request from the client, which includes a desired lease life;

sending a challenge to the client in response to the LLQ setup request, wherein the acknowledgement includes a random LLQ identifier (LLQ-ID) and a granted lease life;

receiving a challenge reply from the client in response to the challenge, wherein the challenge response echoes the LLQ-ID; and sending an acknowledgement to the client in response to the challenge response, along with the information related to the one or more data items as requested by the LLQ.

18. The computer-readable storage device of claim 15, wherein subsequently informing the client of updates to the one or more data items involves:

monitoring a state of the one or more data items specified by the LLQ; and if the state of the one or more data items changes, communicating the changes to the client in one or more gratuitous responses.

19. The computer-readable storage device of claim 18, wherein a gratuitous response message may include multiple data items corresponding to a single LLQ, unless a size of the gratuitous response message exceeds a packet-size limitation.

20. The computer-readable storage device of claim 15, wherein the method further comprises:

receiving a refresh request for one or more LLQs from the client; and allowing the one or more LLQs to remain active for a period of time in response to the refresh request.

21. The computer-readable storage device of claim 20, wherein the method further comprises updating an address or listening port associated with the client upon receiving the refresh request, which indicates a change of the client's address or listening port.

22. The computer-readable storage device of claim 20, wherein the method further comprises sending an acknowledgement to the client in response to the refresh request.

23. The computer-readable storage device of claim 15, wherein if the refresh request specifies a zero-valued lease life, the method further comprises terminating the one or more LLQs specified in the refresh request.

24. The computer-readable storage device of claim 15, wherein the method further comprises:

receiving a terminate request for one or more LLQs from the client; and terminating the one or more LLQs specified in the terminate request.

25. A non-transitory computer-readable storage device storing instructions that when executed by a computer cause the computer to perform a method for discovering a service in a network, the method comprising:

maintaining state information for one or more services in the network on a domain name system (DNS) server;

receiving from a host at the DNS server a DNS-formatted message which includes the LLQ that requests information related a service for which the state information is maintained on the DNS server, which involves:

receiving a lease life in a LEASE LIFE field in the LLQ that indicates a time in seconds for which the DNS server gratuitously informs the host of updates to the service without receiving another query from the host;

communicating from the DNS server to the host an initial response with information related to the service;

subsequent to the initial response, in response to a change of the state information for one or more services, determining whether the request's lease life has expired;

in response to the request's lease life being unexpired, gratuitously sending updates of the service to the requesting host absent of receiving further requests from the host; and in response to the request's lease life being expired, stopping communication of the subsequent updates to the requesting host.

26. A non-transitory computer-readable storage device storing instructions that when executed by a computer cause the computer to perform a method for implementing a long-lived query (LLQ), the method comprising:

sending, from a client to a domain name system (DNS) server, a DNS-formatted message which includes the LLQ that requests information related to one or more data items stored on the DNS server, which involves:

sending a lease life in a LEASE LIFE field in the LLQ that indicates a time in seconds for which the DNS server gratuitously informs the client of updates to the one or more data items without receiving another query from the client;

in response to the LLQ, receiving an initial response from the DNS server with the requested information; and subsequent to the initial response and before the LLQ lease life expires, receiving gratuitous updates of the one or more data items at the client from the DNS server absent of transmitting another query to the DNS server.

27. The computer-readable storage device of claim 26, further comprising sending a refresh request before the LLQ expires so that the LLQ remains active.

28. A non-transitory computer-readable storage device storing instructions that when executed by a computer cause the computer to perform a method for discovering a service in a network, the method comprising:

communicating, from a client at a DNS server a DNS-formatted message which includes a LLQ that requests information related a service for which state information is maintained on the DNS server, which involves:

communicating a lease life in a LEASE LIFE field in the LLQ that indicates a time in seconds for which the DNS server gratuitously informs the client of updates to the service without receiving another query from the client;

in response to the query, receiving an initial response from the DNS server with the information pertaining to the service and the query lease life; and subsequent to the initial response, in response to a change of the state information, determining whether the query lease life expired; and in response to the query lease lift being unexpired, receiving gratuitous updates of the service at the client from the DNS server absent of communicating another query to the DNS server.

29. The computer-readable storage device of claim 28, wherein the method further comprises communicating a refresh request to the DNS server before the query expires, so that the query remains active.

30. An apparatus that implements a long-lived query (LLQ), comprising:

a domain name system (DNS) server configured to, receive a DNS-formatted message from a client that includes the LLQ that requests information related to one or more data items stored on the DNS server, which involves:

receiving a lease life in a LEASE LIFE field in the LLQ that indicates a time in seconds for which the DNS server gratuitously informs the client of updates to the one or more data items without receiving another query from the client;

in response to the LLQ, communicate to the client a current state of the one or more data items, subsequent to the initial response, in response to a change of the current state for one or more services, determining whether the LLQ's lease life has expired; and in response to the LLQ's lease time being unexpired, gratuitously inform the client of updates to the one or more data items absent of receiving another query from the client.

31. The apparatus of claim 30, wherein while receiving the LLQ, the DNS server is configured to:

receive an initial LLQ setup request from the client, which includes a desired lease life;

send a challenge to the client in response to the LLQ setup request, wherein the acknowledgement includes a random LLQ identifier (LLQ-ID) and a granted lease life;

receive a challenge response from the client in response to the challenge, wherein the challenge response echoes the LLQ-ID; and to send an acknowledgement to the client in response to the challenge response, along with communicating to the client a current state of the one or more data items.

32. The apparatus of claim 30, wherein to inform the client of updates to the one or more data items, the DNS server is configured to:

monitor the state of the one or more data items specified by the LLQ for the duration of the LLQ's lease life; and if the state of the one or more data items changes, to communicate the changes to the client in one or more gratuitous responses.

33. The apparatus of claim 32, wherein a gratuitous response message may include multiple data items corresponding to a single LLQ, unless a size of the gratuitous response message exceeds a packet-size limitation.

34. The apparatus of claim 30, wherein the DNS server is further configured to:

receive a refresh request for one or more LLQs from the client; and if the refresh request specifies a non-zero lease life, to renew the lease lives of the one or more LLQs in response to the refresh request.

35. The apparatus of claim 34, wherein the DNS server is further configured to update an address or listening port associated with the client upon receiving the refresh request, which indicates a change of the client's address or listening port.

36. The apparatus of claim 34, wherein if the refresh request specifies a zero-valued lease life, the DNS server is further configured to terminate the one or more LLQs specified in the refresh request.

37. The apparatus of claim 34, wherein the DNS server is further configured to send an acknowledgement to the client in response to the refresh request.

38. The apparatus of claim 30, further comprising an intermediate LLQ proxy configured to:
   receive the LLQ from the client;
   communicate directly with the client; and
   communicate with the DNS server on behalf of one or more clients.

* * * * *